United States Patent [19]

Doskocil et al.

[11] Patent Number: 5,293,323

[45] Date of Patent: Mar. 8, 1994

[54] METHOD FOR FAULT DIAGNOSIS BY ASSESSMENT OF CONFIDENCE MEASURE

[75] Inventors: Douglas C. Doskocil, North Reading; Alan M. Offt, Chelmsford, both of Mass.

[73] Assignee: General Electric Company, Philadelphia, Pa.

[21] Appl. No.: 782,191

[22] Filed: Oct. 24, 1991

[51] Int. Cl.⁵ .............................................. G01B 21/00
[52] U.S. Cl. ............................. 364/551.01; 364/184; 364/550; 364/551.02; 364/554; 395/911; 395/912; 395/913; 395/915; 371/15.1; 371/25.1
[58] Field of Search ............... 371/15.1, 22.5, 22.6, 371/25.1; 395/61, 911, 912, 913, 915; 364/184, 550, 551.01, 551.02, 579, 495, 554, 570

[56] References Cited

U.S. PATENT DOCUMENTS

| | | | |
|---|---|---|---|
| 4,517,468 | 5/1985 | Kemper et al. | 395/915 |
| 4,644,479 | 2/1987 | Kemper et al. | 395/915 |
| 4,847,795 | 7/1989 | Baker et al. | 395/61 |
| 4,985,857 | 1/1991 | Bajpai et al. | 395/912 |
| 5,099,436 | 3/1992 | McCown et al. | 395/911 |
| 5,130,936 | 7/1992 | Sheppard et al. | 395/911 |

Primary Examiner—Jack B. Harvey
Assistant Examiner—Hal D. Wachsman
Attorney, Agent, or Firm—Geoffrey H. Krauss; Allen E. Amgott

[57] ABSTRACT

A method for enabling a diagnostic system to assess, within time constraints, the health of the host system during operation, and to detect and isolate system faults during maintenance, with reduced potential for false alarms due to intermittent real faults and system noise, and for apparent misdiagnosis of the host system health, by use of a Diagnostics by Confidence Measure Assessment (DCMA) process in which a confidence measure is provided for each system test failure assessment, resulting from both the use of specialized persistence processing on many test results from a single source and the use of specialized corroboration processing on many test results from different sources.

14 Claims, 5 Drawing Sheets

METHOD FOR FAULT DIAGNOSIS BY ASSESSMENT OF CONFIDENCE MEASURE

The subject invention was made with Government support under Contract No. F33657-86-C-2144 awarded by the USAF. The U.S. Government has certain rights in this invention.

The present invention relates to diagnostic testing methods and, more particularly, to methods for determining the confidence level of any detected and corroborated persistent fault.

BACKGROUND OF THE INVENTION

In system engineering usage, a fault may be defined as any physical condition which causes an object to fail to perform in a required manner; thus, a failure is an inability of an object to perform its desired function. Failures are detected by evaluation of test results, i.e. the results of comparing a measurement (itself defined as a sample of a signal of interest) to some predetermined operational limits. The primary objective and challenge of a diagnostic system then is to obtain simultaneous high levels of both the coverage and accuracy of fault detection in a system being diagnosed. In fact, a fault detection (FD) effectiveness parameter can be defined, as the product of fault detection coverage and fault detection accuracy, and is a measure of the diagnostic system's ability to detect all potential faults. It is desirable to simultaneously increase the probability of detecting faults in equipment when a fault exists, while reducing the probability of declaring a fault when one does not exist. Increased fault detection, the ability to detect more faults than a previous capability, can be the result of either increased fault coverage, e.g. the presence of more test points in the same equipment, or greater detection accuracy, e.g. the implementation of better tests or processing. Conversely, decreased fault detection leads to missing more real faults, and is almost never desirable.

A false alarm is defined as a fault indication (by Built-In Test or other monitoring circuitry) where no fault exists. However, the user community extends the definition of false alarm to include activity which does not correct the causative fault; this may be actions such as isolating a fault to the wrong module or the inability to reproduce the fault during maintenance. Both false alarms actions result in maintenance actions which do not correct the actual fault; the user's perception is that the causative fault does not exist. Similarly, detection of a temporary or transient real fault is also considered an error. Consider the fault isolation process as applied to an aircraft: if a real fault is detected while the plane is in flight, but cannot be duplicated during ground maintenance, then the maintenance staff considers that fault to be a false alarm. Such a condition is most often caused by intermittent behavior of the system in use, and due to factors including overheating, part fatigue and corrosion, poor calibration, noise and the like. Since the plane is not stressed in the same manner while on the ground, these temporary real faults either disappear or cannot be duplicated; however, continued use of the unrepaired plane is not always a desirable alternative.

Due to the possibility of serious consequences if faults are not properly diagnosed, there have been many past attempts to provide diagnostic systems with ever increasing levels of fault detection effectiveness. Some systems have tried to increase effectiveness by changing test limits and, in some cases, by checking for repeated results. Changing test measurement limits generates mixed results in a system having measurement variations. Noise in either, or both, of the system-under-test (SUT) and the associated diagnostic system, can cause proper measurements, taken in a correctly operating system, to lie in the region of assessed failures, while similar measurements of a failed system may lie in the region of correct operation.

If it is desired to increase fault detection by tightening test limits (e.g. allowing a smaller measurement variation from the mean value before existence of a fault is declared), then the test threshold must move toward the mean value of the measurement. However, since more noisy measurements lie outside the limit of correct operation, the resulting diagnostic system will declare more false alarms. Conversely, to decrease false alarms by changing only a measurement limit will allow more measurement variation (e.g. allow movement of the test limit farther from the measurement mean value) before declaration of a fault condition occurs. However, use of this fault threshold location decreases the diagnostic system's ability to detect a fault, since a noiseless measurement would have to deviate more from its intended location for correct operation before a fault is detected. Accordingly, a new technique is required to simultaneously increase fault detection while reducing false alarms. This new technique is desirably compatible with new, multi-level, integrated diagnostic systems and also desirably capable of an increased probability of detecting faults while reducing, if not eliminating, false alarms and intermittent real faults. Thus, we desire to provide a new method for fault diagnosis which will substantially reduce or eliminate the effects of intermittent faults, noisy measurements, potential false alarms, and out-of-tolerance conditions, while providing flexibility of system changes and implementation in a standardized architecture (capable of replication and similar usage in different system portions and the like). Finally, the high level of Fault Detection without False Alarms must be made in a timely manner in order to facilitate operator and system response to the failure. It is therefore not acceptable to perform extensive post-processing of a test result if such processing will require use of time beyond the system time constraints.

PRIOR ART

Many different diagnostic concepts have previously been tried and found wanting:

a. Treed Fault Analysis—is the traditional, deductive fault analysis method. Tests on the prime item are run sequentially to verify that inputs, power supplies voltages and other equipment states are correct so that a fault may be isolated. Fault isolation flows deductively from an observed or measured failure indication through a sequential set of tests that searches and sequentially eliminates all equipment faults that could have produced that indication. Decisions are made on a binary Pass/Fail basis: if a test passes, one deductive path of two is taken. If the test fails, another deductive path is taken. In both decision legs, more tests are performed and (binary) decisions made until only one fault could have caused the failure indication. Our new fault diagnosis methodology will differ from a Treed Fault Analysis (TFA) in three primary areas: the new method will use a graded fault indication, called a confidence measure, instead of a binary Pass/Fail decision; the deductive part of our new method will operate in parallel fashion rather than in the sequential form of the TFA; and the deductive part of our new method will numerically combine the graded indications of a fault to arrive at a decision rather than use a test Pass/Fail indication to make decisions.

b. M of N Fault Filtering Decisions—is a first generation method of filtering fault indications that are gathered serially from the same test point in order to make a fault decision. N samples of the equipment's state are gathered (generally in a sliding window); if M of these N samples indicate a failed test (measurement outside a limit), then the decision is made that a real failure has occurred. For example, if M=3 of N=5 samples indicate a failure, then the test has failed. Notice that the false alarm reduction method of forcing a test to pass three consecutive times before declaring a fault falls into this category. Our new diagnostic method differs from M-of-N processing at least by utilization of a different process for the persistence analysis of serially-gathered data; we utilize operations unknown to the M-of-N processing form, such as averaging of multiple-sample differences and the like.

c. Module Intelligent Test Equipment (MITE)—is a diagnostic concept, developed as the Automated Systems Department of General Electric Company, that diagnoses the health of equipment by looking for correct operating states of the prime equipment, rather than by looking for faults and fault symptoms. Decisions are made from the combined probability of failure obtained from test results to assess equipment states. Among other objectives, this method attempts to prevent an improper fault diagnosis when a fault and its symptoms have not been identified in a Failure Modes and Effects Critical Analysis (FMECA). We have retained the use, during fault detection, of correct operating states as a basis for decisions, but then utilize the new concept of confidence measure, rather than a probability of failure indication.

d. Abductive Reasoning—is a model-based diagnostic method apparently originated by Abtech Corporation of Charlottesville, Va. In its execution, abductive reasoning samples the input and output states of an equipment being diagnosed. These input states are then passed through the equipment model; the outputs of the model are compared to the actual output samples from the equipment being diagnosed. If the differences between corresponding equipment and model outputs are sufficiently large, a fault is declared. This approach may be unique in the architecture of the model (a multiple-input, multiple-output, third-order, cross-coupled-input polynomial), and the AIM program which generates model information about the equipment to be diagnosed, by calculating the coefficients of the polynomials from expected output states of the equipment being diagnosed when the equipment is presented with a range of inputs. Models may be developed at different levels and combined to synthesize more complicated models. We prefer to not use a model as the basis of our diagnostic system.

e. Diagnostic Expert Systems—are computer programs that logically combine operational and fault information about the system in order to diagnose equipment faults. The decision-making process (i.e. hypothesize a fault and then search for the system states that can cause that fault, or observe symptoms and then search for faults that match those symptoms) is part of the expert system software. The information used to reach decisions and the symptoms that are associated with a fault are entered into tables. The software operates on this table-resident data to make logical conclusions based on the state of the SUT equipment. We will continue to operate on information tables in our new method, but will, at least, add numerical and local combinations the graded indication of equipment states, to arrive at our fault decisions.

f. Neural Networks applied to Diagnostic Systems—are a relatively new form that combines diagnostic information, represented at a very low-level (i.e. digital bits) and makes a decision based on (bit) pattern recognition techniques, which we prefer not to use in our new method.

BRIEF SUMMARY OF THE INVENTION

In accordance with the invention, a DCMA method for operating a diagnostic processor (a microcontroller or general purpose computer, which is either embedded in portions of the system-under-test or is resident in its own module and connected to the SUT) interacts with the system-under-test through test points and other (inherent or unique) monitoring devices within that system. The method for diagnosing the failure condition during operation and maintenance of the associated system, using a plurality of system test points, comprising the steps of: performing a sequence of each of a plurality of individual tests upon the system to evoke a like sequence of responses at a designated configuration of test points; determining a persistence factor T for a sequential set of a plurality N of at least one selected test response; converting the T factor to a confidence measure CM for that set of sequential test responses; determining at least one failure mode based upon all of the selected test responses; and corroborating the determined failure mode by comparison to other data obtained from the system, prior to reporting the existence of that mode for the system.

DETAILED DESCRIPTION OF THE INVENTION

Figure 1:
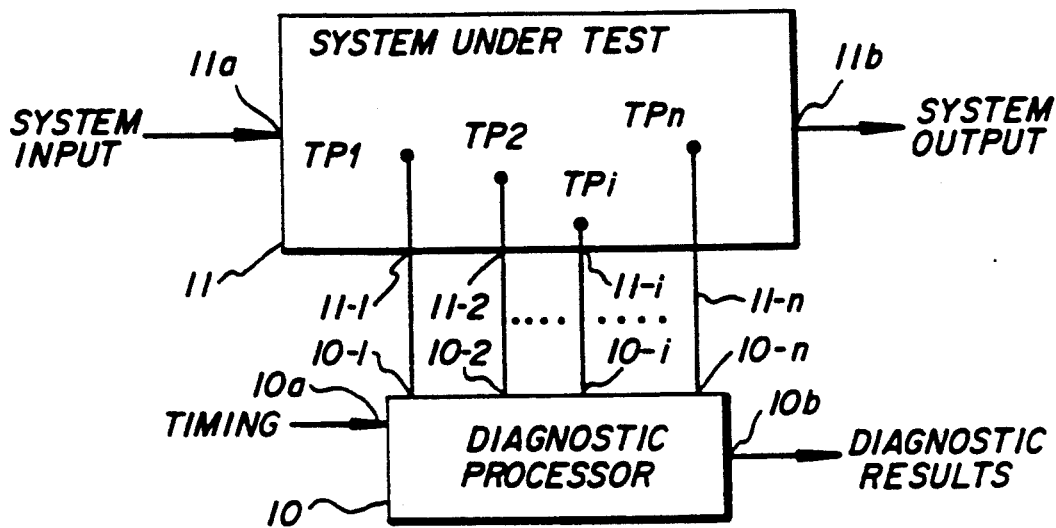
FIG. 1 is a schematic block diagram of a system under test and interconnected with a diagnostic processor, utilizing the novel methods of the present invention.

Referring initially to FIG. 1, a diagnostic processor 10 may be a microcontroller, microcomputer or other general purpose computational element or hard-wired subsystem and the like, programmed to carry out our novel DCMA method, as hereinbelow described, on a system 11 under test (SUT). The system receives system inputs at an input port 11a and provides, responsive thereto, system outputs at an output port 11b; during operation, the system provides various test signals, each at an associated one of a plurality N of test points TP1-TPn. Each test point is coupled to a corresponding one of test outputs 11-1 through 11-n, and thence to a corresponding one of test inputs 10-1 through 10-n of the diagnostic processor. The processor may also receive timing and test state number inputs via a timing input port 10a. The processor performs a failure mode evaluation, to assess whether or not a failure has occurred in the system (and the prevailing system conditions if there is a failure), and provides its results and a measure indicative of the confidence in that evaluation, at an output port 10b, for subsequent use as desired.

Figure 2:
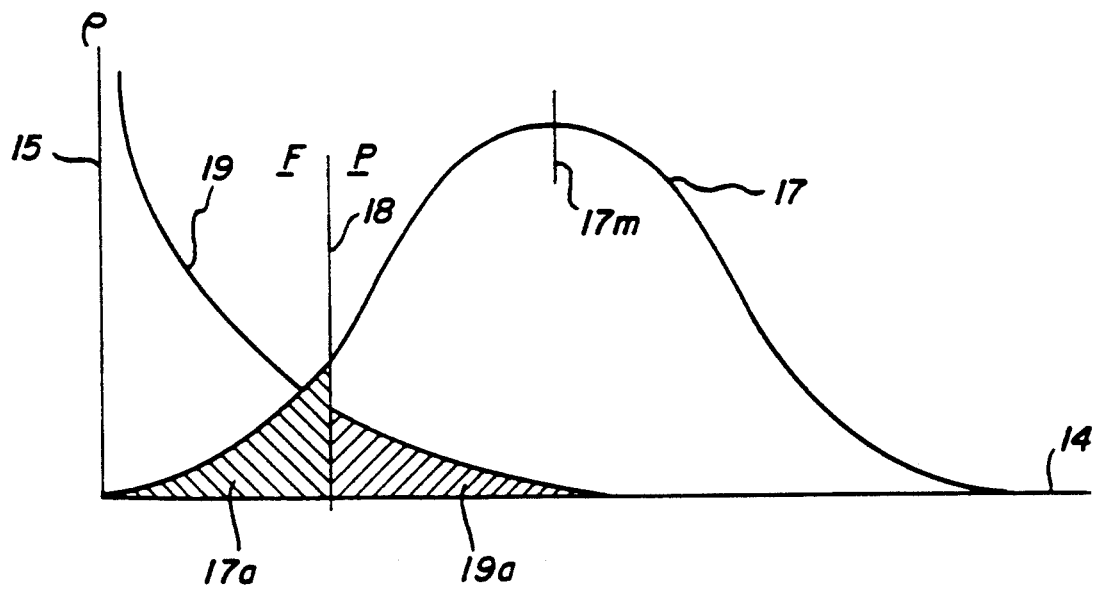
FIG. 2 is a graph illustrating the noise-included probability density functions of failed and correctly-operating systems.

Referring now to FIG. 2, it will be seen why the confidence measure, which is a numerical result used to represent both the persistence and corroboration of failure evaluation results, in used to reduce the susceptibility of the diagnostic process to noise effects. The graph has an abscissa 14 scaled in terms of test value, with an ordinate 15 scaled in terms of the probability $p$ of any particular test value occurring for a particular test. Curve 17 is the well-known Gaussian probability density function of any one test result occurring in a properly operating real system (i.e. a system having some normal, non-zero, amount of noise); the bell-shaped curve 17 peaks at the expected mean value 17m of the test result. If a threshold value 18 is used to establish a pass-fail test criterion (i.e. with test passage for all values above value 18 and test failure for all values below value 18), then there will be a region 17a in which a failure may be diagnosed, due to noise effects, even through the system, by definition, is operating correctly—area 17a represents undesired false alarms. Similarly, on a curve 19 of the probability density function of test results in a known-failed system, the system noise will likely cause failure-signals to be detected as values falling in a portion 19a which results in undesired test passage. Thus, one sees that it is highly desirable to reduce, if not remove, the effects of test value noise on the diagnostic process.

Figure 3A:
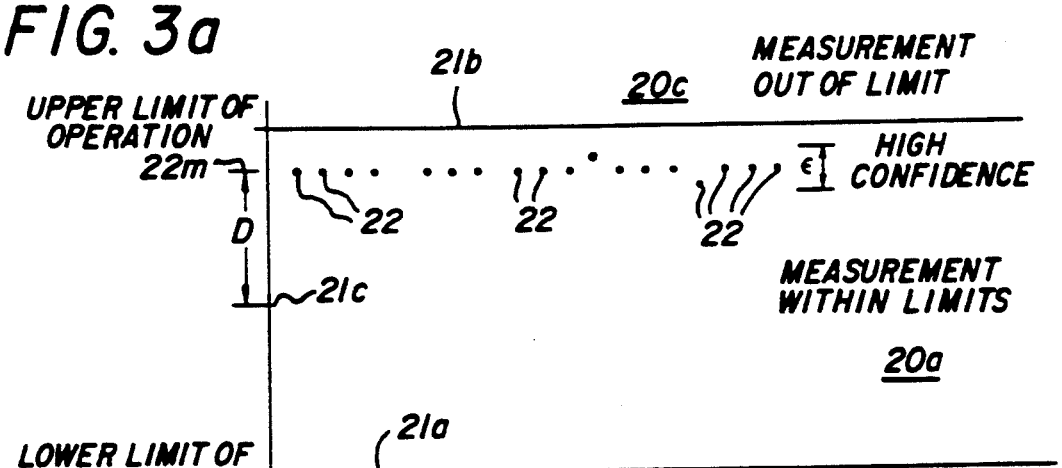
FIGS. 3a-3c are graphic examples of how different degrees of persistence can operate with differing measurements to obtain different degrees of test confidence.
Figure 3B:
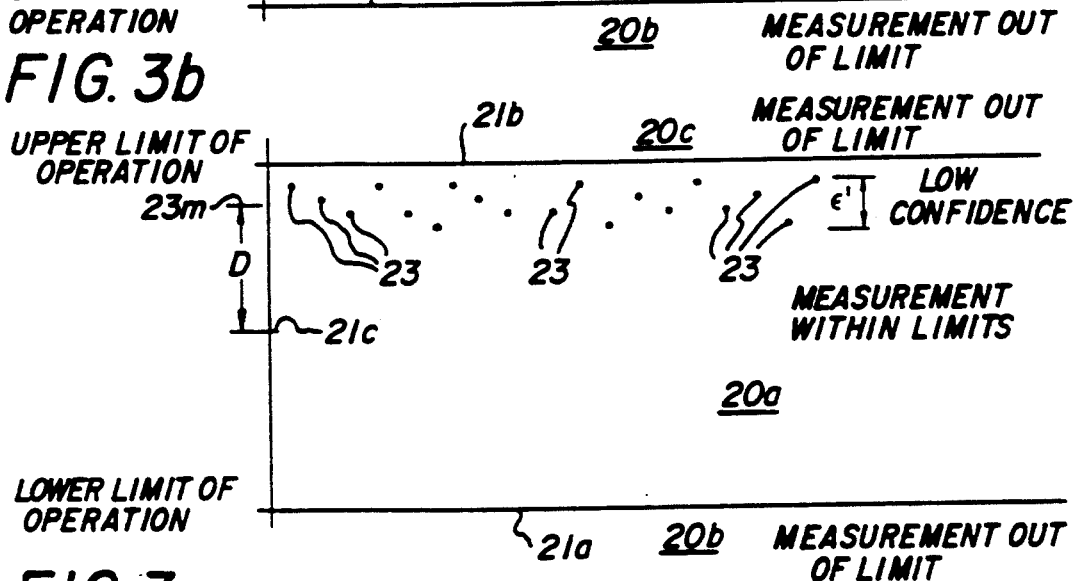
Figure 3C:
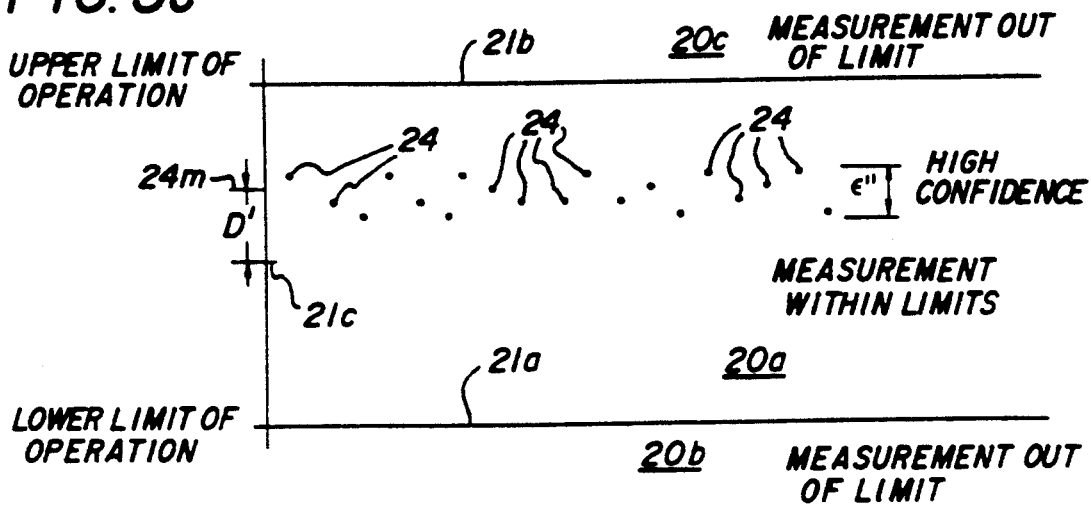

One proposed solution to the noise problem is to average a set of several measurements for the identical test condition. As seen in FIGS. 3a-3c, there is a further problem in the confidence which one can place on any set of results: the measurement acceptability area 20a is bounded by both an unacceptable area 20b, for out-of-limit results below a lower limit 21a of operation, and an unacceptable area 20c, for out-of-limit results above an upper operational limit 21b. The proximity of the plural test measurements 22 to either limit 21 is not the only characteristic to be considered. Thus, both set 22 (FIG. 3a) and set 23 (FIG. 3b) have the same average value (with a set mean value 22m or 23m at the same distance D from the center value 21c of the acceptable band 20a, but set 22 has a relatively small measurement error band $\epsilon$, caused by noise and the like, while the measurement error band $\epsilon'$ of set 23 is larger (i.e., $\epsilon < \epsilon'$) than set 22. Based on the greater possibility of a noise-induced false alarm in the wider error band of set 23, we say that we have a "low" confidence for set 23, i.e. have lower confidence that set 23 has measured a passing value within allowable limits, and have a "high" confidence for set 22, i.e. have higher confidence that set 22 has measured a passing value within allowable limits. Similarly, for another set 24 (FIG. 3c) of an equal number of measurements of the same parameter, with an error band $\epsilon''$ about as big as that of set 23, i.e. $\epsilon'' \approx \epsilon'$, we can say that we have high confidence for set 24 and low confidence for set 23, because the set 24 mean value 24m is so much closer to the within-limits center value 21c, i.e. the difference D' between values 24m and 21c is less than the set 23 mean value 23m-center value 21c distance D and is D' is much less than the within-limits tolerance band half-distance (value 21c to limit 21a or 21b). Thus, the confidence in a measurement set should be related to the persistence of the measurements, and is a combination of at least noise and separation factors.

In accordance with the invention, we utilize several new processing methods to reduce false alarms and increase fault detections; we call the general methodology "Diagnostics by Confidence Measure Assessment" (DCMA). Several features we have developed are:

1. The use of a confidence measure as a test result indication.
2. The use of specialized persistence processing on many test results from a single source.
3. The use of specialized corroboration processing on many test results from different sources.

Confidence Measure

Our Confidence Measure (CM) is a numerical indication, between $-1$ and $+1$ defining how well a test passes its limits of operation (when CM is a positive value) and/or how well a test detects a specific failure (when CM is a negative value). Thus, a resulting CM of $-1$ indicates that a test has been failed with 100% confidence, while a CM of $+1$ indicates that there is 100% confidence that the passing of a test was correct.

The intent of the Confidence Measure is to provide a graded indication of test results so that the state of a unit may be interpreted more accurately than just a Pass or Fail. In addition, it provides a mechanism with which to combine many test results, using corroboration processing, in order to provide a more accurate assessment of a unit's health.

Persistence

Persistence is defined as the DCMA process of using more than one sample of a test results from a single source to calculate a confidence measure in the conclusion inferred from the test being carried out.

Persistence tends to produce a stable measurement and indicate the certainty that a set of measurements of the same parameter, at the same test point, are within operating limits, so as to eliminate both short-term intermittencies and measurement noise. Persistence may be a serial evaluation of measurements obtained from the same source.

Figure 4:
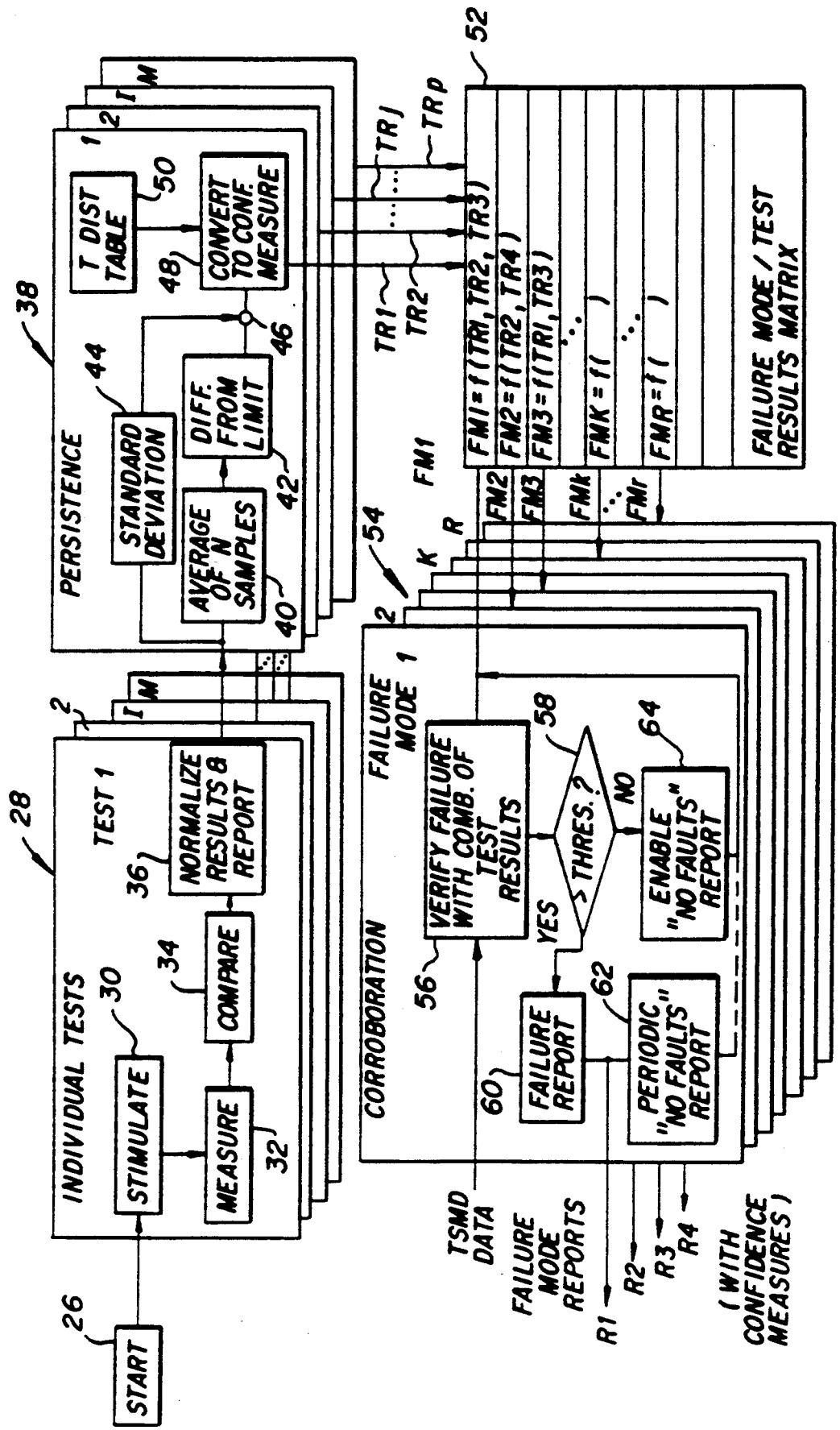
FIG. 4 is a test method logic flow diagram for the method of the present invention.

Referring to FIG. 4, the diagrammed step-by-step flow of a presently preferred embodiment of our method is commanded to start (step 26) and then enters the individual testing subroutine 28, wherein, for each one of a plurality M of different tests, various inputs stimulate (step 30) the SUT, so that responses can be measured (step 32) at the various test points TPi, for $1 \leq i \leq n$. Each test can be a standardized implementation, with a set-up selected to exercise certain preselected paths through each equipment with known stimuli, using predetermined built-in-test (BIT) configurations. Each measured response is a signal of interest which is compared (step 34) to the known value for a fully-operational SUT; the difference results are normalized to test limits and reported (step 36) to the persistance subroutine 38 as one of a stream of measurements.

Persistence processing occurs for each individual test; in the illustrated embodiment, a specific persistence processing method operates on the last "N" test result samples of the stream. The number of samples and the operational limits can be standardized, in accordance with predetermined parameter tables. During processing, the average of the last N measurements, using the present sample and the (N−1) previous samples, is calculated and subtracted from the closest limit NL of correct operation (steps 40 and 42); the same result can be obtained, with greater difficulty in implementation and execution, by reversing the order of operations and subtracting each measured value from its nearest limit before averaging the differences. At the same time, a standard deviation $\sigma$ from this average difference is calculated (step 44) for the same "N" samples. A T value is calculated (step 46) by dividing the resultant average difference by the standard deviation $\sigma$ and multiplying the result by the square root of the number of samples. The calculated T value is converted to a confidence measure CM (step 48) by using a prestored parameter look-up table (step 50) which maps ranges of T values to confidence measures associated with the specific test.

Thus:

$$T = [(AVE(M) - NL, \text{ over } N \text{ samples})/\sigma(M)] * \sqrt{N}$$

and $$CM = f(T),$$

where:
  CM is the confidence measure in the test result
  T is an intermediate T measure
  M is the measured sample from the SUT
  NL is the limit of correct operation that is nearest the measurement in the range of operation
  N is the number of sequential samples
and
  f() is a table whose contents maps T values to Confidence Measures.

The speed and resulting confidence of this persistence technique can be adjusted by changing the number N of samples used to make a decision and the threshold NL of hypothesizing a fault. Thus, persistence processing of "raw" measurement samples tends to eliminate intermittent fault indications, compensate for measurement "noise" and provide a variable test reporting latency dependent upon both noise level and proximity of the measurement to its acceptable operational limits, with a confidence value result dependent upon the all of these factors.

Corroboration

Corroboration is defined as the DCMA process of using more than one sample of test results from different sources to calculate a confidence measure in the conclusion drawn from a SUT failure. Generally, more than one positive test result is needed for the corroboration process to produce a high-confidence result. If two test points are sequentially located along a test route, then using corroboration one may say that the route has failed when test results indicating that the signal measured at both of the sequential test points has failed with high confidence.

The totality of test results TRj, for $1 \leq j \leq M$, can be combined, often with parallel processing, to find at least one failure mode FMk, for $1 \leq k \leq R$, by passage through a predetermined failure mode/test results matrix 52, based on the test results TRj which indicate that at least one failure has occurred. One of the failure modes can be the absence of failures. These various failure mode indicators FMk are processed in subroutine 54 for reportage of corroborated FMs. Subroutine 54 arithmetically and logically combines these test results, represented by confidence measures, to generate a numerical evaluation (the confidence measure, between −1 and +1) about the status of that failure mode. The process (step 56) of combining test results uses mathematical operators (+, −, *, /), logical operators (AND, OR, NOT, COMPLEMENT), and constants as tools to detect and verify faults, along with data as to which test source was used to produce the current response data. The result of this combination is then compared (step 58) to a pre-defined threshold. If the result exceeds the threshold (a YES decision), step 60 is entered and a failure is declared via a Failure Report Rx, so that an action associated with this Rx indication can be executed. If all Failure Mode assessements indicate that no faults are present, then a periodic "No Faults" report is sent (step 62) and the subroutine made to return to its beginning, to corroborate the next set of failure mode data received from the matrix 52. If the result does not exceed the threshold (a NO decision), step 64 is entered and a "No Fault" indication is kept enabled for this set of failure modes, and the action will be returned to corroborate the next failure mode found.

A separate Corroboration process must be designed for each system failure mode, by choosing candidate test results for evaluation of each different mode (test with different source, etc.) and then developing methods to combine these test results to reach a failure conclusion. The various combinations of all failure modes may be grouped into the matrix 52 format as part of the DCMA. The matrix is a convenient method to mangage all of the known failure modes. If all test results for a built-in test (BIT) level are arranged in columns of the matrix and failure modes for the same BIT level were arranged in rows of the matrix, then entires in the body of the matrix will "mark" those test results which contribute to verifying any one failure mode, where each row in the matrix is a test vector of results (confidence measures) which uniquely identifies a failure mode. The mechanics of corroborating reports combines confidence measure entries in the failure mode/test results matrix to validate faults and detect out-of-tolerance conditions. An example of such a matrix (containing numerical test results) is:

|  | Test Results | | | |
|---|---|---|---|---|
|  | TR1 | TR2 | TR3 | TR4 ... TRn |
| Failures |  |  |  |  |
| FM1 | −0.2 | 0 | +0.7 | 0 |
| FM2 | 0.3 | −0.8 | 0.5 | +0.1 |
| FM3 | 0.5 | 0 | −0.5 | −0.7 |

Thus, FM1 (the first failure mode) uses the first and third test results (TR1 and TR3) to verify this mode, FM2 (the second failure mode) uses the first four test results TR1 through TR4 to verify a failure, and so forth. Any intersection, of a failure mode row and a test result column, which is without a confidence measure or which has a zero quantity therein indicates that the particular test result is not required to reach that failure mode decision. This matrix gives a quick, visual method to determine if all failures can be isolated by a unique set of tests.

Corroboration processing comprises combining test results (confidence measures) using arithmetic operators, logical operators and constants as specified in a Failure Mode defining statement or equation, which we call a Failure Mode Operator Line. This line may operate on test results of one failure mode in a stack oriented process as specified by pointers to test results, operator tokens, constants and evaluation criteria listed on the line. An Operator Line results is a numerical value which is compared to the evaluation criteria to make a failure mode decision and generate the confidence measure CM value in that decision. In comparison to a binary process, the combination of low confidence in a number of test results which have just passed their limits of correct operation could be combined to correctly assess a system failure since the graded confidence in each test contributes to the failure mode evaluation procedure. It will be understood that common Algebraic method, reverse Polish negotiation or any other desired method can be used for the Operator Line calculations.

Corroboration operates in two modes: foreground and background. The foreground mode is evoked when a received test report indicates a failure (negative confidence measure). That test report would then be used as an index that points to all failure modes in the Failure Mode/Test Results matrix which use that test result as an entry. Corroboration processing then evaluates this restricted subset of failure modes to quickly corroborate the reported failed test indication using all other required test reports.

In the background mode, corroboration processing operates on the present test result entries in the matrix to assess potential out-of-tolerance conditions. In this mode, it sequentially evaluates all failure modes to determine if the combination of test results in any one failure mode indicates degraded (or failed) performance. With a view of operating in this mode, the failure mode/test results matrix might best be called a functional operation matrix and could be thought of as containing values of correct SUT operation rather than values which indicate failures.

In either mode, if a corroborated system failure report R is issued from step 60, a predetermined course of action (system shut-down, manual intervention request, automatic switch-over to redundant subsystem, and the like actions) can be carried out, as part of subsequent step 60.

EXAMPLES

Figure 5A:
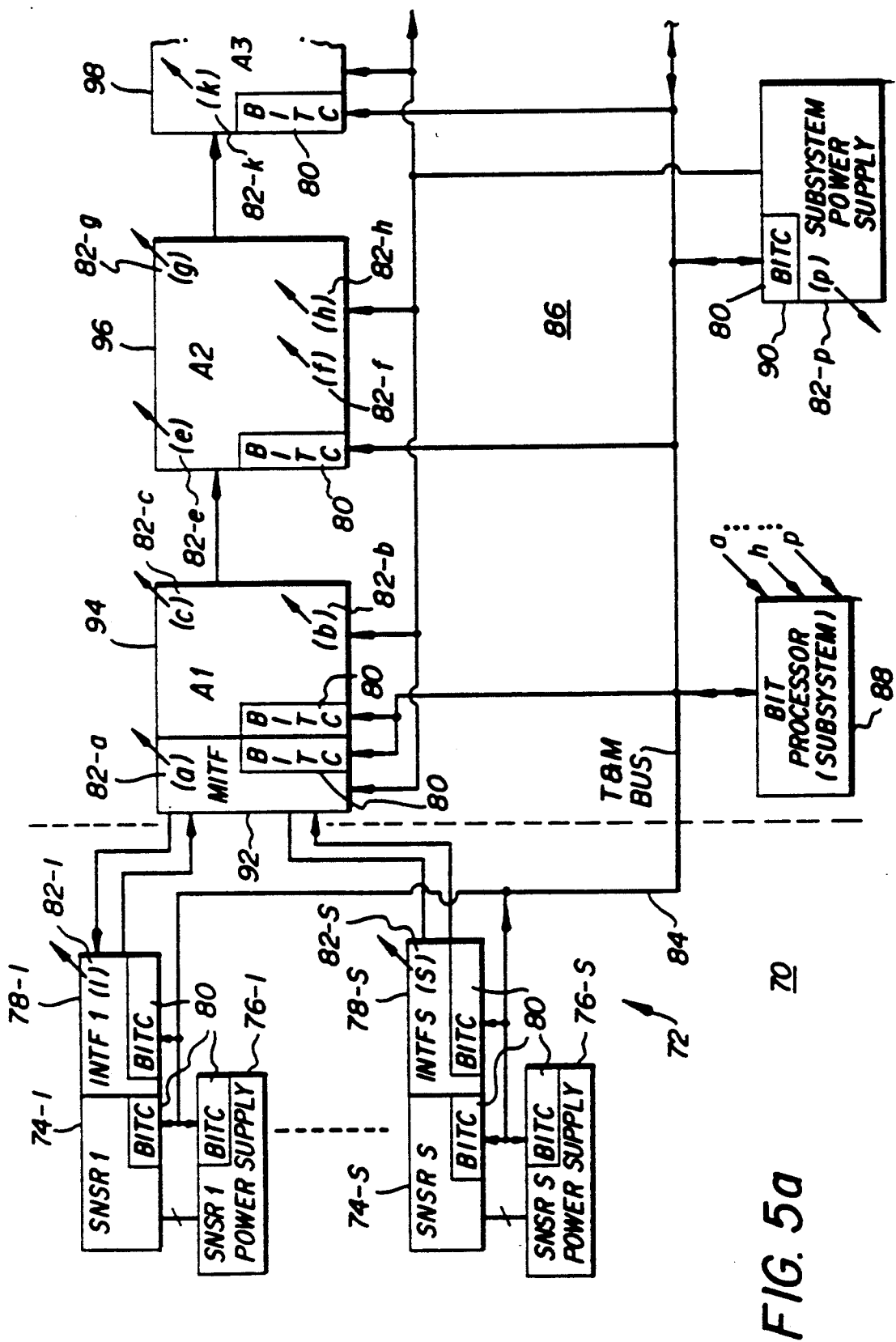
FIG. 5a is a schematic block diagram of a portion of a system to be tested for illustration purposes using the present invention.
Figure 5B:
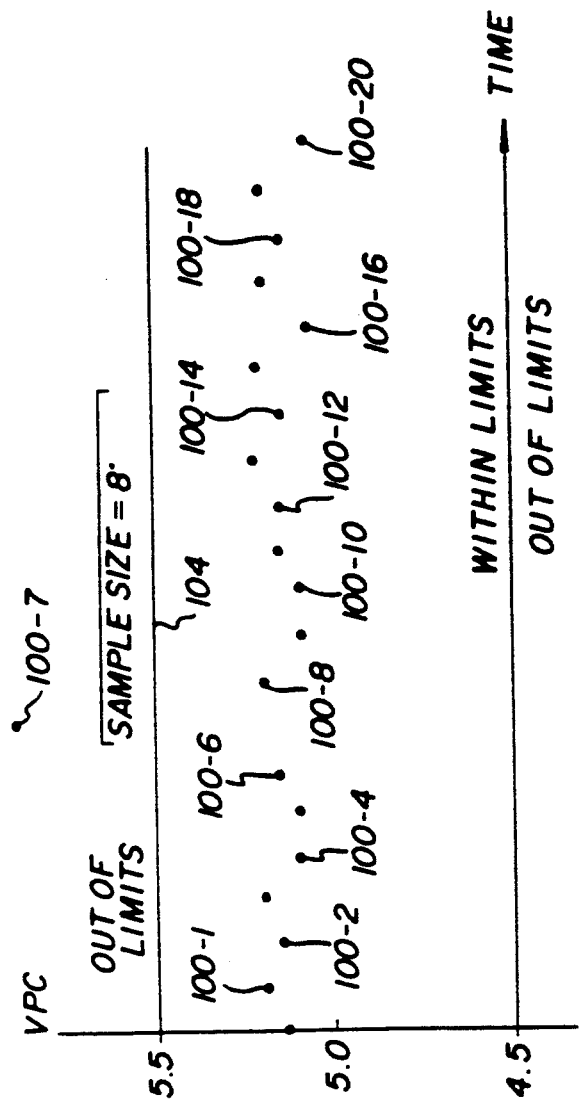
FIGS. 5b and 5c are time-coordinated graphs respectively illustrating a series of measurements and the Confidence Measures evaluated for a running set of N of those measurements.
Figure 5C:
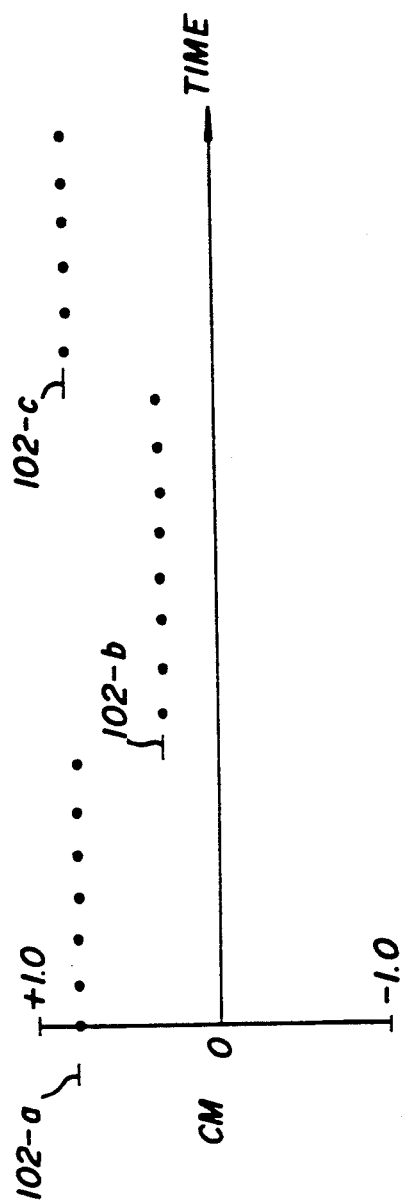

Referring now to FIGS. 5a–5c, we consider the problem of confidence and persistence in a set of measurements of a subsystem powered by an intermittent power supply. An equipment 70 has a plurality S of sensor means 72, such as sensors 74-1 through 74-S, each powered by its own power supply means 76, such as means 76-1 through 76-S; control inputs to each sensor and output of sensed data from each sensor is provided through an associated interface INTF means 78-1 through 78-S. Each of the units (sensor 74, power supply 76 and INTF means 78) may have a built-in-test controller BITC means 80, to establish test conditions, so that test result data can be provided from associated test points 82, responsive to commands on a common test and measurement (T&M) bus 84. The sensors provide their information to a sensor-data-processing subsystem 86, including a built-in-test subsystem processor 88, coupled to all of the BITC units 80 via T&M bus 84, and a subsystem power supply 90, providing operating potential(s) to all of the various subsystem stages 92-98. Each of the main interface MITF means 92 and the subsequent A1, A2, A3, . . . stages may have a BITC means 80, and have test points 82-a, . . . , 82-h, . . . 82-p, . . . from which data is sent to test processor 88, which includes the functions of diagnostic processor 10 and the DCMA methodology.

The operating +5 volt DC power to stage A2 is monitored by the 82-h test point "h", which, for a sequence of twenty test/measurement intervals, sends back the measurement data represented by datums 100-1 through 100-20 in FIG. 5b; note the intermittent nature of measurement 100-7 (perhaps caused by a noise "spike" at the A2 power input terminal). Having predeterminately chosen a sample size $N=8$, the confidence measure CM for a traveling N sample set has a different persistence for N measurement intervals after the intermittent measurement 100-7, and (as shown in FIG. 5c) higher CM levels 102-a (prior to the intermittent datum 100-7) are changed to the lowered level 102-b of the Confidence Measure for $N(=8)$ intervals after receipt of the spike; the CM level 102-c returns to a higher level once the effect of the spike's disturbance on the persistence is removed by the sample size traveling beyond the out-of-limit measurement. By way of illustration only, if the measurements 100-1 through 100-6 and 100-8 through 100-20 all range from about 5.12 to about 5.18 VDC and the nearer upper limit 104 is set at $+5.5$, then the high confidence measure level 104a and 104c is about $+0.8$ for a T value of $(5.5-5.15)/(0.125)*\sqrt{8} \approx 7.9$; responsive to a voltage spike 100-7 of about 6.0 VDC, the T value drops to $(5.5-5.325)/(0.17)*\sqrt{8} \approx 3.0$ and the Confidence Measure falls to the lower level 102-b of about $+0.3$, for the eight measurement intervals associated with measurements 100-8 through 100-15. The persistence can be easily interpreted by reference to the following chart:

| P value | Measurement Status | Report |
|---|---|---|
| +1.0 | Stable and Inside Limits | "Good Health" for $+1 \geq P \geq +0.3$ |
| ≈+0.7 | Within 3σ of variation inside limits | |
| ≈+0.6 | Inside of, but close to, limit | |
| ≈+0.3 | | Send result to Corroboration for further analysis |
| ≈+0.1 | Has variation greater than the average difference from limit | |
| 0.0 | Recently changed significantly | |
| ≈−0.1 | Oscillating significantly | |
| ≈−0.3 | | |
| ≈−0.6 | Outside of, but close to, limit | Test failure for $-0.3 \geq P \geq -1$ |
| ≈−0.7 | Within 3σ of variation outside limits | |
| −1.0 | Stable and outside limits | |

The above example illustrates the use of DCMA method Persistence and Confidence Measure aspects; the same system of FIG. 5a will be used to illustrate the Corroboration aspect features of multiple test result use for evaluation of failure mode status, failure verification via information obtained from various locations in a module/subsystem/system, fault isolation, conclusion production from a set of low-confidence test results, the foreground mode evaluation of failure modes which use a reported test and the background mode continuous evaluation of all failure modes to determine possible out-of-tolerance conditions. Detection of a fault is illustrated by detection of the failure of the A1 assembly output by the out-of-limit test response at test point 82-c, and the subsequent corroboration by measurement of an out-of-limit condition oat the A2 input test point 82-e. Isolation of a fault can be illustrated, for the failure of assembly A2, by testing the A2 input, at test point 82-e and determining that the signal there is within limits, then corroborating this "okay" condition by determining that the module control signal at A2 control test point 82-f is also correct; when the A2 output amplitude test point 82-h is measured and found to be outside the limits of normal operation, and corroborated by testing the next assembly A3 input amplitude at test point 82-k and determining operation there is also outside of limits, the fault is isolated to assembly A2. If the conditions at respective test points 82-e, 82-f, 82-g and 82-k are respectively named TRa, TRb, TRc and TRd, then a Failure Mode Operator Line (FMOL) for this isolation example can be written as:

[MAX of(MIN(NEG(2*Tra+Trb)/3) OR 0.0)]

OR

[MAX of(Trc OR Trd)] < −0.7 where the test results TRx, for a≦x≦d, are the Confidence Measure values for that particular test point response. The following table is one example illustrating the use of Corroborative processing, with only those corroborated CMs less than −0.7 being assessed as faults (note that in this example, only a failed output test will result in reportage of a fault):

dence measures of sequential ones of all of the selected test responses, as specified by a predetermined corroboration-failure mode operator line; and (e) corroborating the determined failure mode by a numerical combination of comparisons to other data obtained from the system, prior to reporting the existence of that mode for the system.

2. The method of claim 1, wherein step (a) includes the steps of: providing each of a plurality of sets of test stimuli to the system; measuring a response to each stimulus at each of a predetermined pattern of test points; and comparing each response measurement to a predetermined desired response.

3. The method of claim 2, wherein step (a) further includes the step of normalizing each response measurement prior to reporting the normalized data to the persistence-determination step.

4. The method of claim 1, wherein step (b) includes the step of determining the persistence only for test response data measured for test inputs from a single source.

5. The method of claim 4, wherein step (b) further includes the step of comparing each test response to a closest one of a predetermined set of limits for correct operation of the system during that test.

6. The method of claim 5, wherein step (b) further includes the steps of: averaging a predetermined number (n) of samples of the same test response at the same test point; finding the difference between the sample average and the closest correct-operation test limit for that test; determining a standard deviation from the average difference and the sample number (n); and calculating the T factor value from the average difference

| FMOL: MAX OF(MIN (NEG((2*TR1 + TR2)/3) OR 0.0) OR MAX OF(TR3 OR TR4) < −0.7 | | | | | | | | | | | | | | | |
|---|---|---|---|---|---|---|---|---|---|---|---|---|---|---|---|
| IN ORDER OF EXECUTION: | | | | | | | | | | | | | | | |
|  | TR1, | 2, | *, | TR2, | +, | 3, | /, | NEG, | 0.0 | MIN, | TR3, | TR4 | MAX, | MAX: | < −0.7 |
| FAILURE MODES: | | | | | | | | | | | | | | | |
| NO FAILURE | +0.7 | 2 | 1.4 | +0.7 | +2.1 | 3 | 0.7 | −0.7 | 0.0 | −0.7 | +0.7 | +0.7 | +0.7 | +0.7 | |
| OUTPUT FAILS | +0.7 | 2 | 1.4 | +0.7 | +2.1 | 3 | 0.7 | −0.7 | 0.0 | −0.7 | −0.7 | −0.7 | −0.7 | −0.7 | |
| INPUT FAILS | −0.7 | 2 | −1.4 | +0.7 | −0.7 | 3 | −0.2 | +0.2 | 0.0 | 0.0 | −0.7 | 0.0 | +0.0 | +0.0 | |
| CONTROL FAILS | +0.7 | 2 | +1.4 | −0.7 | +0.7 | 3 | +0.2 | −0.2 | 0.0 | −0.2 | −0.7 | −0.2 | −0.2 | −0.2 | |
| BIT MONITOR FAILS | +0.7 | 2 | +1.4 | +0.7 | +2.1 | 3 | 0.7 | −0.7 | 0.0 | −0.7 | −0.7 | +0.7 | +0.7 | +0.7 | |

While several examples of our novel DCMA methodology are described herein, those skilled in the art will now understand that many modifications and variations can be made within the spirit of out invention. It is therefore our intent to be limited only by the scope of the appending claims and not by way of details and instrumentalities presented by way of description of the exemplary embodiments.

What we claim is:

1. A method for diagnosing the failure condition during operation and maintenance of a system having a plurality of test points, comprising the steps of:

(a) performing a sequence of each of a plurality of individual tests upon the system to evoke a like sequence of measured responses at a designated configuration of test points;

(b) determining a persistence factor T for a sequential measured set of a plurality N of at least one selected test response;

(c) converting the T factor to a bipolar confidence measure CM then established for that set of sequential test responses actually measured;

(d) determining at least one failure mode based upon a preselected combination of a plurality of confiand standard deviation values.

7. The method of claim 6, wherein the T factor calculating step includes the steps of: dividing the resulting average difference value by the resulting standard deviation value; and multiplying the result by a factor relating to the number (n) of samples used in the averaging step.

8. The method of claim 7, wherein the multiplying step factor is the square root ($\sqrt{n}$) of the number of samples used in the average.

9. The method of claim 6, wherein step (b) further includes the step of using a sliding average of the last (n) samples, including the present sample and the last (n−1) samples at the same test point.

10. The method of claim 1, wherein step (c) includes the step of obtaining a CM value for the calculated persistence factor value by addressing a preestablished look-up table mapping each possible persistence value to an associated confidence measure value.

11. The method of claim 1, wherein step (d) includes the step of determining that no-failure modes exist when there are no persistently incorrect measurements within the system being tested.

12. The method of claim 1, wherein step (d) includes the steps of: repeating steps (a)–(c) for a different test source; and calculating a new confidence measure for the joint set of test responses from all sources used.

13. The method of claim 12, wherein step (e) further includes the steps of: numerically combining into a final failure mode result R the confidence measures from other test sources and the failure mode data found responsive to all input source repetitions; comparing the combined result R against a pre-defined threshold; and declaring a system failure to exist if R exceeds the threshold.

14. The method of claim 13, wherein step (e) includes the step of taking a pre-established course of action which is different for each failure mode, prior to declaration of a system failure.

* * * * *